United States Patent [19]

Kim

[11] Patent Number: 5,021,885
[45] Date of Patent: Jun. 4, 1991

[54] AUTOMATIC BRIGHTNESS LIMITER

[75] Inventor: Kwang-Seok Kim, Suwon, Rep. of Korea

[73] Assignee: SamSung Electronics Co., Ltd., Suweon, Rep. of Korea

[21] Appl. No.: 375,473

[22] Filed: Jul. 5, 1989

[51] Int. Cl.[5] .................. H04N 5/235; H04N 5/57
[52] U.S. Cl. ................................. 358/168; 358/169
[58] Field of Search ................... 358/168, 169, 170

[56] References Cited

U.S. PATENT DOCUMENTS 3,873,767 3/1975 Okada ............................. 358/168

FOREIGN PATENT DOCUMENTS 0010781 2/1981 Japan ............................. 358/168

Primary Examiner—Howard W. Britton
Assistant Examiner—Michael H. Lee
Attorney, Agent, or Firm—Robert E. Bushnell

[57] ABSTRACT

The invention provides an automatic brightness limiter having an amplification means to amplify the video signal and applying the image signal at the next stage and a contrast adjustment means to adjust the contrast of a screen through active components, the device comprising; control means which controls automatically the image signal level and the contrast of the CRT by controlling the outputs of the amplification means and the contrast adjustment means using a high voltage applied to an anode through control components, and lied between the amplification means and the contrast adjustment means. Improving the capacity of the brightness adjustment for the screen of the automatic brightness limiter may be attained according to the present invention.

1 Claim, 1 Drawing Sheet

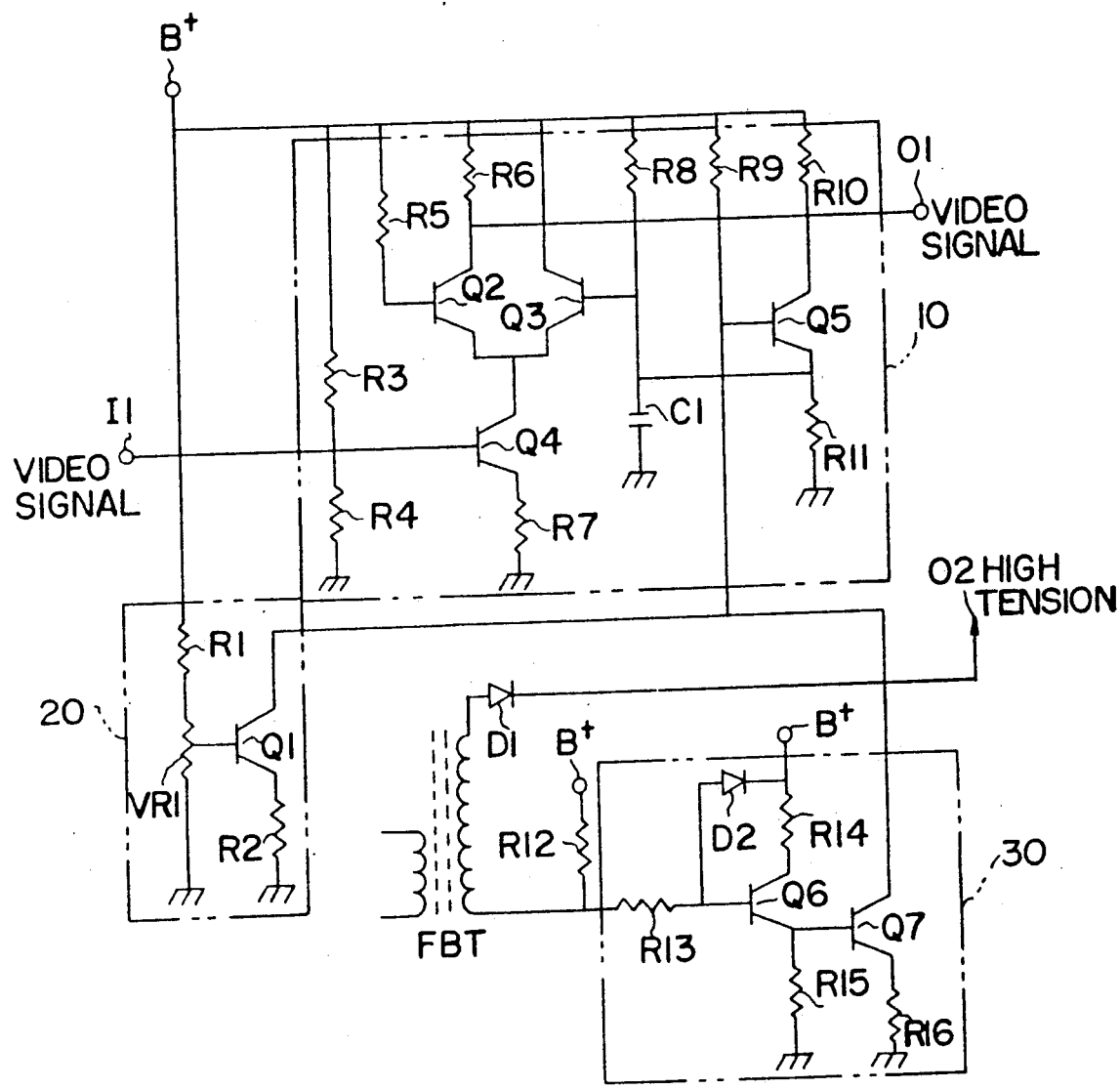

AUTOMATIC BRIGHTNESS LIMITER

BACKGROUND OF THE INVENTION

The present invention relates to an automatic brightness limiter of a cathode ray tube(CRT or Braun tube).

In the past, the brightness can be controlled, but if the brightness of the CRT increases, the entered image level of the CRT can be large and the white and black level can be more large, thus the problem missing the white balance of the CRT has been occured.

SUMMARY OF THE INVENTION

The present invention has been made in consideration of this and has for it object to provide a automatic brightness limiter in which the image signal level and the contrast are separated each other and controlled by a high voltage applied to an anode so that the white balance missing of the CRT can be prevented and the brightness control ability of the CRT can be improved.

According to the present invention, there is provided an automatic brightness limiter having an amplification means to amplify the video signal and applying the image signal at the next stage, and the contrast adjustment means to adjust the contrast of a screen through active components, the device comprising; a control means which controls automatically the image signal level and the contrast of the CRT by controlling the outputs of the amplification means and the contrast adjustment means using a high voltage applied to an anode, through control components, and lied between the amplification means and the contrast adjustment means.

BRIEF DESCRIPTION OF THE DRAWING

FIG. 1 is a circuit diagram of the present invention.

DETAILED DESCRIPTION OF THE INVENTION

The present invention will be now described in more detail with reference to the accompanying drawing.

In the FIGURE, the amplification means 10 consists as follows: the video signal of an input terminal I1 can be amplified through transistors Q2–Q5 connected to bias resistors R3–R11 and the condensor C1 for removing the noise, and the amplified signal of the collector of the transistor Q2 for a differential amplifier is applied to a cathode of the CRT lied at the next stage of an output terminal O1, and the contrast adjustment means 20 is also consists as follows: the power supply B+ can drive a transistor O1 through resistors R1, R2 and the variable resistor VR1, and the control means 30 is consists as follows: a high voltage to the next stage of the output terminal Q1 from the secondary part of a flyback transformer(FBT) drives transistors Q6 and Q7 through bias resistors R13–R16 and transistors Q6 and Q7 through bias resistors R13–R16 and a diode D2, thereby controlling the amplification means 10 and the contrast adjustment means 20. Also, a diode D1 and a resistor R12 connected the secondary part of FBT are for rectifying. To explain the operation of the present invention, it follows.

In the circuit diagram, the supply voltage B+ turns transistors Q2–Q4 on through resistors R3–R8 so the applied video signal to the input terminal I1 is amplified through transistors Q2 and Q3 of the differential amplifier, and provided to the cathode of the CRT through the output terminal O1, also the supply voltage B+ turns Q1 on through the resistor R1 and the variable resistor VR1 for adjustment of contrast, and the supply voltage B+ is connected to a ground through the resistor R9 and the transistor Q1, thus the contrast of the screen can be adjusted by the variable resistor VR1.

At the same time, a low voltage is applied to a base of p-n-p transistor Q5, and turns Q5 on, thus the supply voltage B+ stabilizes the bias voltage of the transistor Q3 for the differential amplifier through the capacitor C1 for removing a noise.

At this time, the supply voltage B+ connected to a secondary coil of FBT through a resistor R12 is applied to an anode of the CRT through the diode D1 so that the normal screen of the CRT can be reproduced.

Where, if the brightness of the screen is raised, a high voltage applied to the output terminal D2 through FBT is increased, and a transistor Q6 is turned on since a low voltage is applied to a base of the transistor Q6, and the transistor Q7 is also turned on through resistors R14, R15 and the transistor Q6, thereby reducing the voltage applied to transistor Q1 for adjustment of contrast, thus brightness of the CRT can be automatically reduced.

On the other hand, the user can adjust manually the brightness of the screen by adjusting the variable resistor VR1.

And, a voltage across the resistor R11 is reduced, thereby reducing the bias voltage of the transistor Q3.

Thus the level of the image signal connected to the output terminal O1 is automatically reduced, thus the white balance of screen is automatically controlled and a normal screen can be reproduced.

Thus, if the brightness of the CRT is increased, the output of the contrast adjustment means 20 and the amplification means 10 can be automatically reduced so that the brightness and white balance of the CRT can be automatically adjusted.

The present invention can be used for connecting a automatic beam limit circuit of the CRT.

As mentioned above, the present invention can provide an automatic brightness limiter of the CRT which can improve the capacity of the brightness adjustment for the screen, wherein the high voltage applied to an anode of the CRT controls the image level applied to cathode of the CRT and the contrast adjustment means.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. An automatic brightness limiter, comprising:
   means for amplifying a video signal and applying an image signal to a next stage,
   contrast adjustment means for adjusting contrast of a screen through active components, and
   control means for automatically controlling image signal level and contrast for a cathode ray tube by controlling said amplifying means and said contrast adjustment means using a high voltage applied to an anode through control components, coupled between said amplifying means and said contrast adjustment means.

* * * * *